US012701486B2

(12) United States Patent
Awada et al.

(10) Patent No.: US 12,701,486 B2
(45) Date of Patent: Aug. 4, 2026

(54) USE OF ESTIMATED ARRIVAL PROBABILITY-RELATED INFORMATION TO SELECT TARGET SECONDARY NODES FOR EARLY DATA FORWARDING FOR DUAL CONNECTIVITY WIRELESS COMMUNICATIONS

(71) Applicant: Nokia Technologies Oy, Espoo (FI)

(72) Inventors: Ahmad Awada, Munich (DE);
Amaanat Ali, Espoo (FI); Halit Murat Gürsu, Munich (DE); Panagiotis Spapis, Munich (DE); Teemu Mikael Veijalainen, Espoo (FI); Sina Khatibi, Munich (DE)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 18/493,489

(22) Filed: Oct. 24, 2023

(65) Prior Publication Data

US 2024/0147339 A1     May 2, 2024

(30) Foreign Application Priority Data

Nov. 1, 2022     (GB) ...................................... 2216177

(51) Int. Cl.
*H04W 36/36*     (2009.01)
*H04W 36/00*     (2009.01)

(52) U.S. Cl.
CPC ..... *H04W 36/362* (2023.05); *H04W 36/0069* (2018.08)

(58) Field of Classification Search
None
See application file for complete search history.

(56) References Cited

U.S. PATENT DOCUMENTS

2024/0323773 A1*   9/2024   Da Silva ............... H04W 36/08
2025/0247762 A1*   7/2025   Wu ........................ H04W 76/27
(Continued)

FOREIGN PATENT DOCUMENTS

CN           114765813 A      7/2022
WO       2020/263152 A1    12/2020
(Continued)

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.1.0, Jun. 2022, pp. 1-112.
(Continued)

*Primary Examiner* — Scott M Sciacca
(74) *Attorney, Agent, or Firm* — Lippes Mathias LLP

(57)     ABSTRACT

According to example embodiment, a method may include transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and transmitting, by the master node (MN) to a source-secondary node (S-SN) that provides dual connectivity for a user device, information indicating or relating to an arrival probability of a cell change for the user device to the target-secondary node (T-SN).

12 Claims, 7 Drawing Sheets

Transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device   410

Transmitting, by the master node (MN) to a source-secondary node (S-SN) that provides dual connectivity for a user device, information indicating or relating to an arrival probability of a cell change for the user device to the target-secondary node (T-SN)   420

(56)                    References Cited

U.S. PATENT DOCUMENTS

2025/0351019 A1* 11/2025 Hsieh .................... H04W 36/38
2025/0365633 A1* 11/2025 Byun .................. H04W 36/362

FOREIGN PATENT DOCUMENTS

| | | | |
|---|---|---|---|
| WO | 2022/021272 | A1 | 2/2022 |
| WO | 2022/021282 | A1 | 2/2022 |
| WO | 2022/086933 | A1 | 4/2022 |
| WO | 2022/151200 | A1 | 7/2022 |
| WO | 2022/151306 | A1 | 7/2022 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"Introduction of CPA and inter-SN Cpc", 3GPP TSG-RAN WG2 Meeting #116-e, R2-2111640, CATT, Nov. 1-12, 2021, 34 pages.
"3rd Generation Partnership Project; Technical Specification Group Radio Access Network; NG-RAN; Xn application protocol (XnAP) (Release 17)", 3GPP TS 38.423, V17.1.0, Jun. 2022, pp. 1-613.
"Msc-generator", Sourceforge, Retrieved on Nov. 21, 2023, Webpage available at : https://sourceforge.net/projects/msc-generator/.
"XnAP Completion of Direct Early Data Forwarding support from source SN during SN-initiated Inter-SN CPC when multiple candidate target SNs are involved", 3GPP TSG-RAN WG3 Meeting #117-e, R3-224781, Intel Corporation, Aug. 15-24, 2022, 5 pages.
Search Report received for corresponding United Kingdom Patent Application No. 2216177.2, dated Apr. 21, 2023, 3 pages.
Extended European Search Report received for corresponding European Patent Application No. 23201721.0, dated Apr. 4, 2024, 9 pages.
"Discussion on Conditional PScell Addition/Change procedures", 3GPP TSG RAN WG3#111-e, R3-210106, Agenda: 14.3, China Telecom, Jan. 25-Feb. 5, 2021, 4 pages.
Notice of Allowance received for corresponding European Patent Application No. 23201721.0, dated Mar. 10, 2025, 8 pages.

* cited by examiner

Example Wireless Network 130

Figure 4:
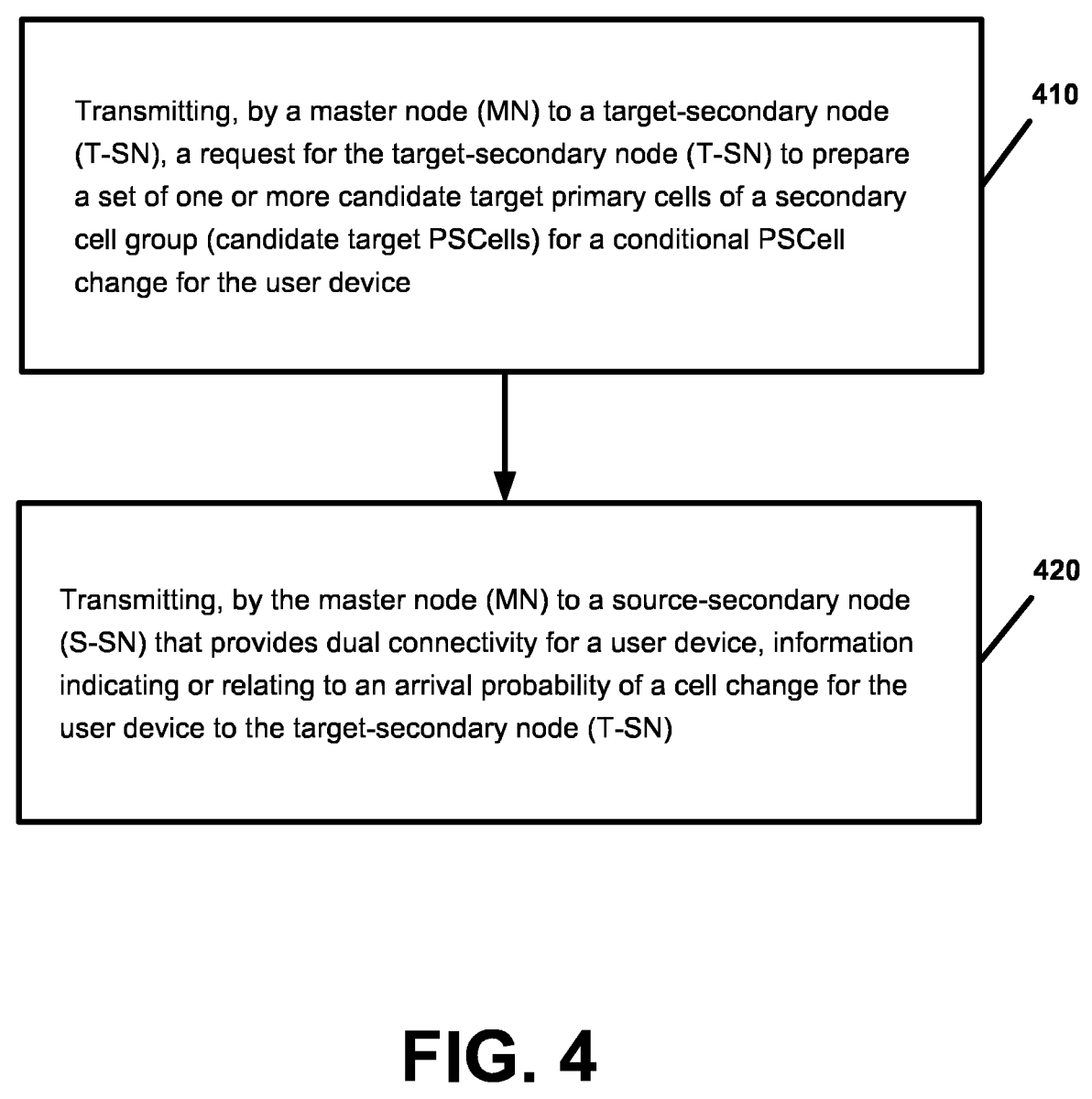

Transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device

410

Transmitting, by the master node (MN) to a source-secondary node (S-SN) that provides dual connectivity for a user device, information indicating or relating to an arrival probability of a cell change for the user device to the target-secondary node (T-SN)

Figure 5:
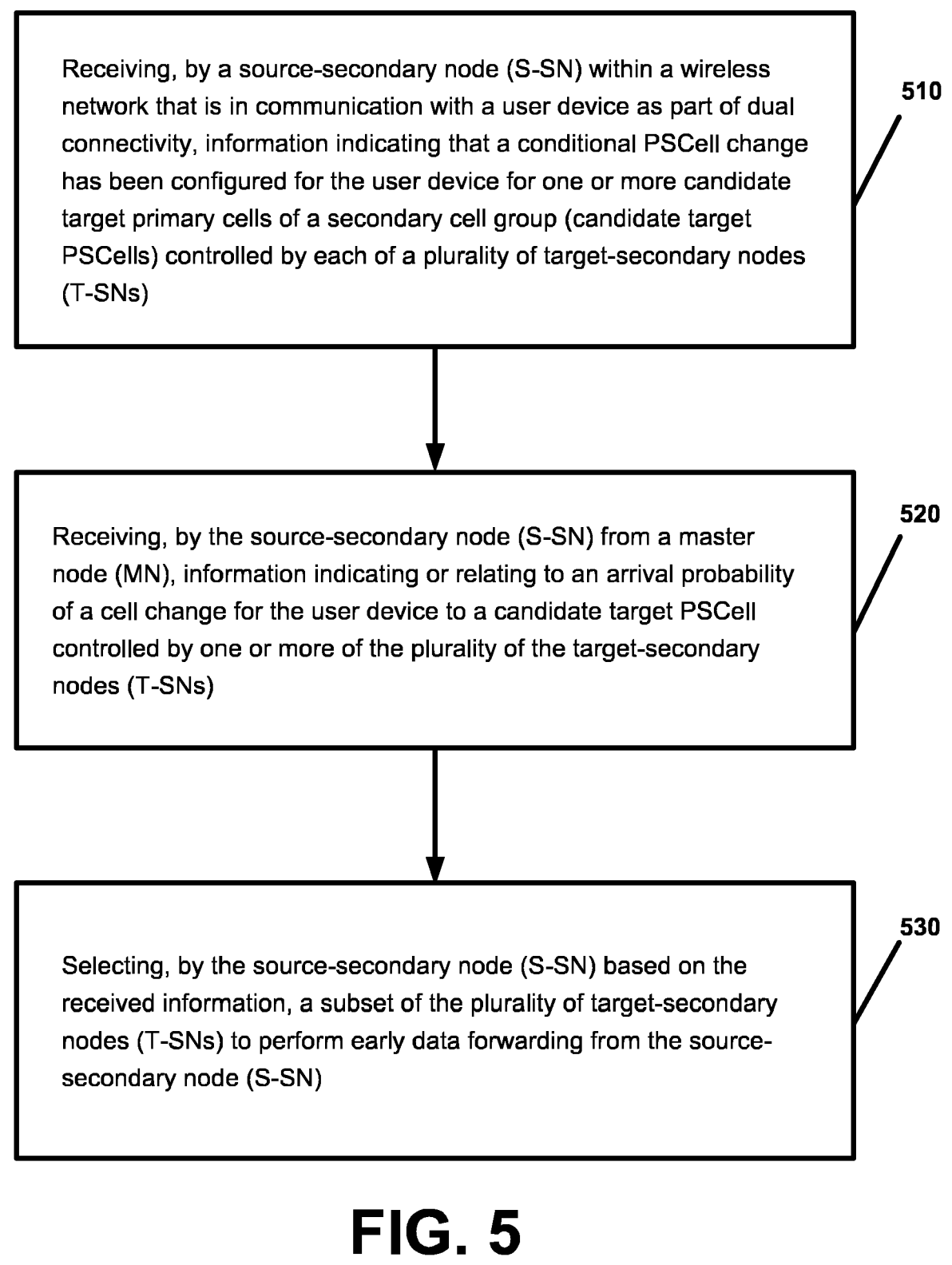

Receiving, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs)

510

Receiving, by the source-secondary node (S-SN) from a master node (MN), information indicating or relating to an arrival probability of a cell change for the user device to a candidate target PSCell controlled by one or more of the plurality of the target-secondary nodes (T-SNs)

520

Selecting, by the source-secondary node (S-SN) based on the received information, a subset of the plurality of target-secondary nodes (T-SNs) to perform early data forwarding from the source-secondary node (S-SN)

USE OF ESTIMATED ARRIVAL PROBABILITY-RELATED INFORMATION TO SELECT TARGET SECONDARY NODES FOR EARLY DATA FORWARDING FOR DUAL CONNECTIVITY WIRELESS COMMUNICATIONS

RELATED APPLICATION

This application claims priority from GB Application No. 2216177.2, filed on Nov. 1, 2022, and entitled "USE OF ESTIMATED ARRIVAL PROBABILITY-RELATED INFORMATION TO SELECT TARGET SECONDARY NODES FOR EARLY DATA FORWARDING FOR DUAL CONNECTIVITY WIRELESS COMMUNICATIONS" which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and transmitting, by the master node (MN) to a source-secondary node (S-SN) that provides dual connectivity for a user device, information indicating or relating to an arrival probability of a cell change for the user device to the target-secondary node (T-SN).

According to an example embodiment, a method may include receiving, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs); receiving, by the source-secondary node (S-SN) from a master node (MN), information indicating or relating to an arrival probability of a cell change for the user device to a candidate target PSCell controlled by one or more of the plurality of the target-secondary nodes (T-SNs); and selecting, by the source-secondary node (S-SN) based on the received information, a subset of the plurality of target-secondary nodes (T-SNs) to perform early data forwarding from the source-secondary node (S-SN).

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a flow chart illustrating operation of a master node (MN) according to an example embodiment.

FIG. 5 is a flow chart illustrating operation of a source secondary node (S-SN) according to an example embodiment.

DETAILED DESCRIPTION

Figure 1:
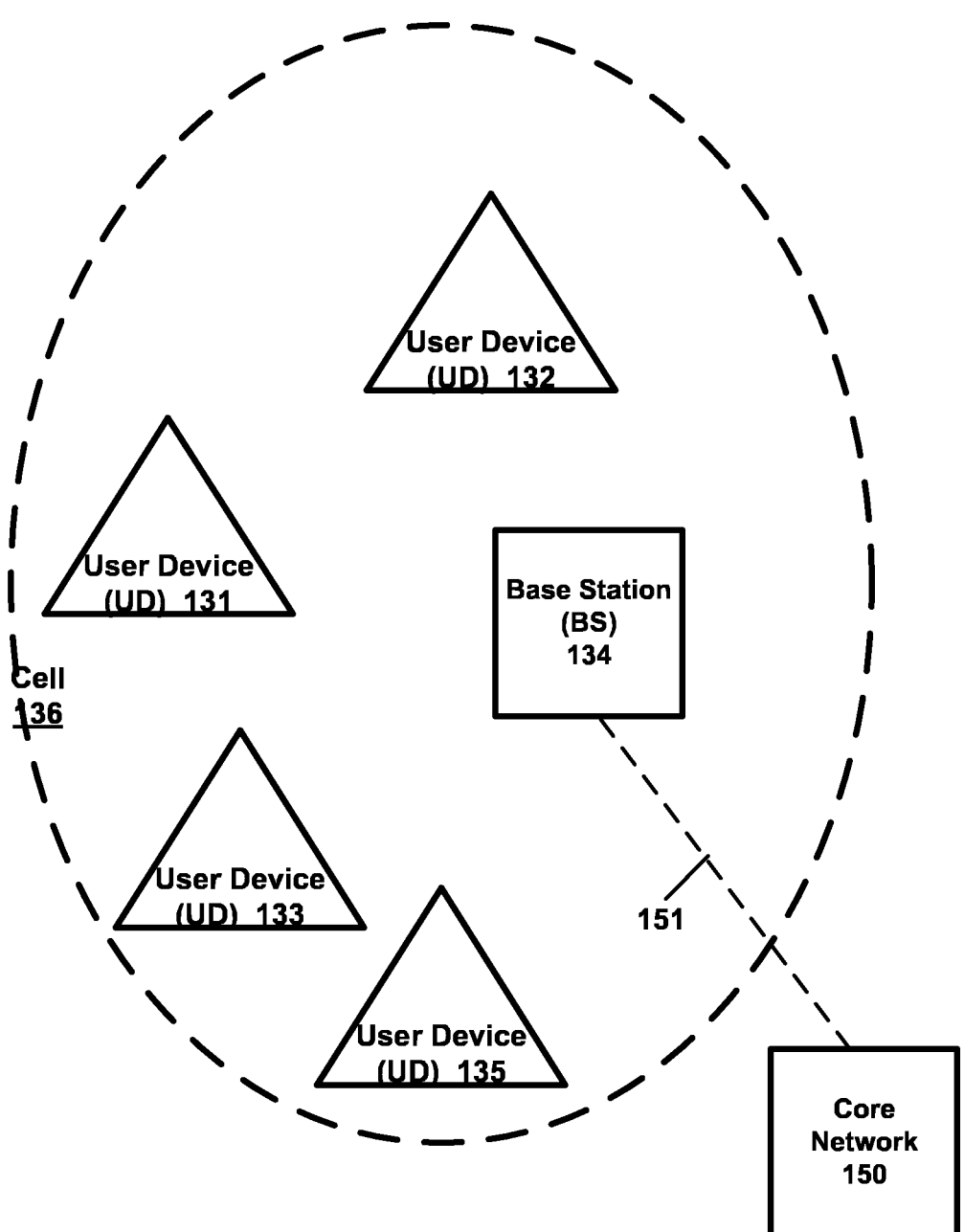
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MS s) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e) Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

In dual-connectivity (or more generally referred to as multi-connectivity), a UE (or user device) may be connected to multiple base stations or network nodes simultaneously, where the network nodes may be of the same or different radio access technologies (RATs). Thus, for multi (or dual)-connectivity, each of the network nodes may be an eNB, gNB, or other network node. For example, one of the network nodes may be referred to as a master node (MN) (e.g., master gNB (MgNB) or master eNB (MeNB)), while another network node may be referred to as a secondary node (SN) or a secondary network node (e.g., a secondary gNB (SgNB) or secondary eNB (SeNB)). For dual or multi-connectivity, the UE may, for example, establish a first connection to a MN, and then may establish a second connection to a SN. For each of the network nodes (MN or SN) that the UE is connected to, the UE may be able to communicate and/or receive data via multiple (a plurality of) cells, e.g., using carrier aggregation (CA). The cells of the MN may be referred to as a master cell group (MCG), while the cells of a SN may be referred to as a secondary cell group (SCG).

In the case of dual or multi-connectivity, the first cell within the MN to which the UE connects is typically known as the Primary Cell (PCell), while the first cell within the SN to which the UE connects is typically known as the Primary Secondary Cell or primary cell of secondary cell group (PSCell), which serves as a primary cell as far as the UE's connectivity to the SN is concerned. The PCell and the PSCell may each be allocated physical uplink control channel (PUCCH) resources to allow the UE to send HARQ (Hybrid Automatic Repeat Request) ACK/NAK (HARQ acknowledgement/negative acknowledgement) feedback, and other control information, to the MCG (or MN) and SCG (or SN), respectively.

Figure 2:
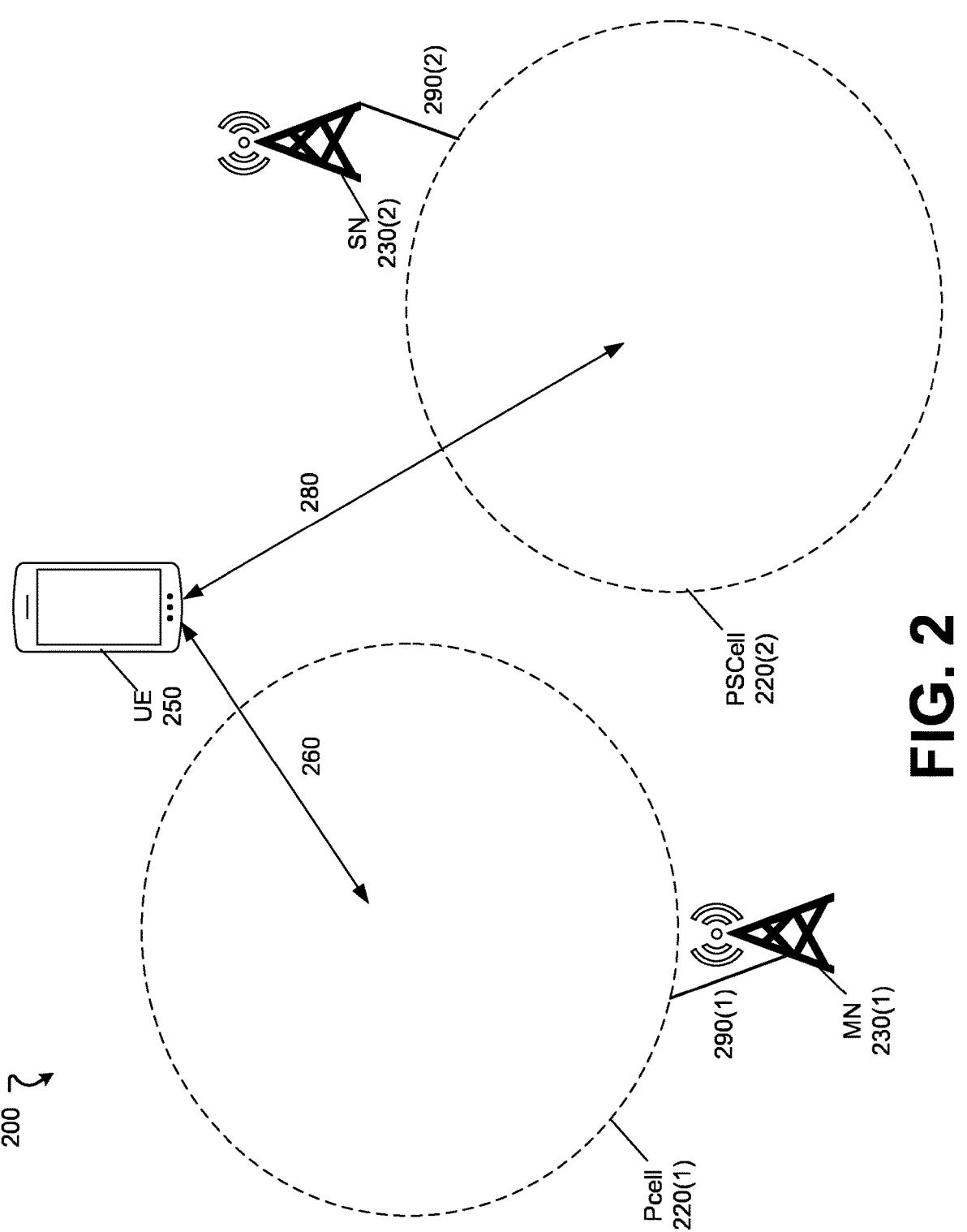
FIG. 2 is a diagram illustrating a network in which dual connectivity is established.

FIG. 2 is a diagram illustrating a network 200 in which dual connectivity is established. Within the network 200, a UE 250 is served by a PCell 220(1) associated with a MN 230(1). The UE 250 has an RRC (radio resource control) connection 260 (e.g., which may be established by UE via a random access procedure between UE and PCell) with the PCell 220(1). The UE 250 may also be served by a PSCell 220(2) associated with a SN 230(2). The UE 250, in some implementations, may have a NR-DC (New Radio Dual Connectivity) connection 280 with the PSCell 220(2). Each of the MN 230(1) and SN 230(2) may communicate with PCell 220(1) and PSCell 220(2), respectively, over respective data radio bearers (DRBs) 290(1) and 290(2), for example.

To establish the dual connectivity within the network 200, the UE 250 may establish a RRC connection 260 to the PCell 220(1). If the UE 250 is eligible (e.g., configured) for dual connectivity, the network 200 can assign the PSCell 220(2) to the UE 250 based on measurements (e.g., reference signal received power (RSRP) or reference signal received quality (RSRQ) measurements) made by the UE 250.

Handover (HO) (or cell change) procedures may be used in 5G NR to allow a change or handover of the UE between nodes, e.g., such as from a source secondary node (S-SN) to a target secondary node (T-SN), e.g., to maintain robustness of connection between a user equipment (UE) and a wireless network over different cells. A UE handover (HO) or cell change may be performed for a UE for both MN and SN, e.g., based on measurement reports and/or a HO (or cell change) trigger condition being satisfied.

Also, a conditional PSCell Change (CPC) may be performed by a UE, which is a PSCell change procedure that is executed only when PSCell execution condition(s) are met. To improve the robustness, the network can provide the up to 8 candidate cell configuration(s) associated with execution condition(s) to UE. If CPC is configured in the RRCReconfiguration, the UE maintains connection with source PSCell after receiving CPC configuration and starts evaluating the CPC execution conditions for the candidate PSCell(s). If at least one CPC candidate PSCell satisfies the corresponding CPC execution condition, the UE may detach from the source PSCell, applies the stored corresponding configuration for the selected candidate PSCell and synchronizes and/or connects to that candidate target PSCell.

Figure 3:
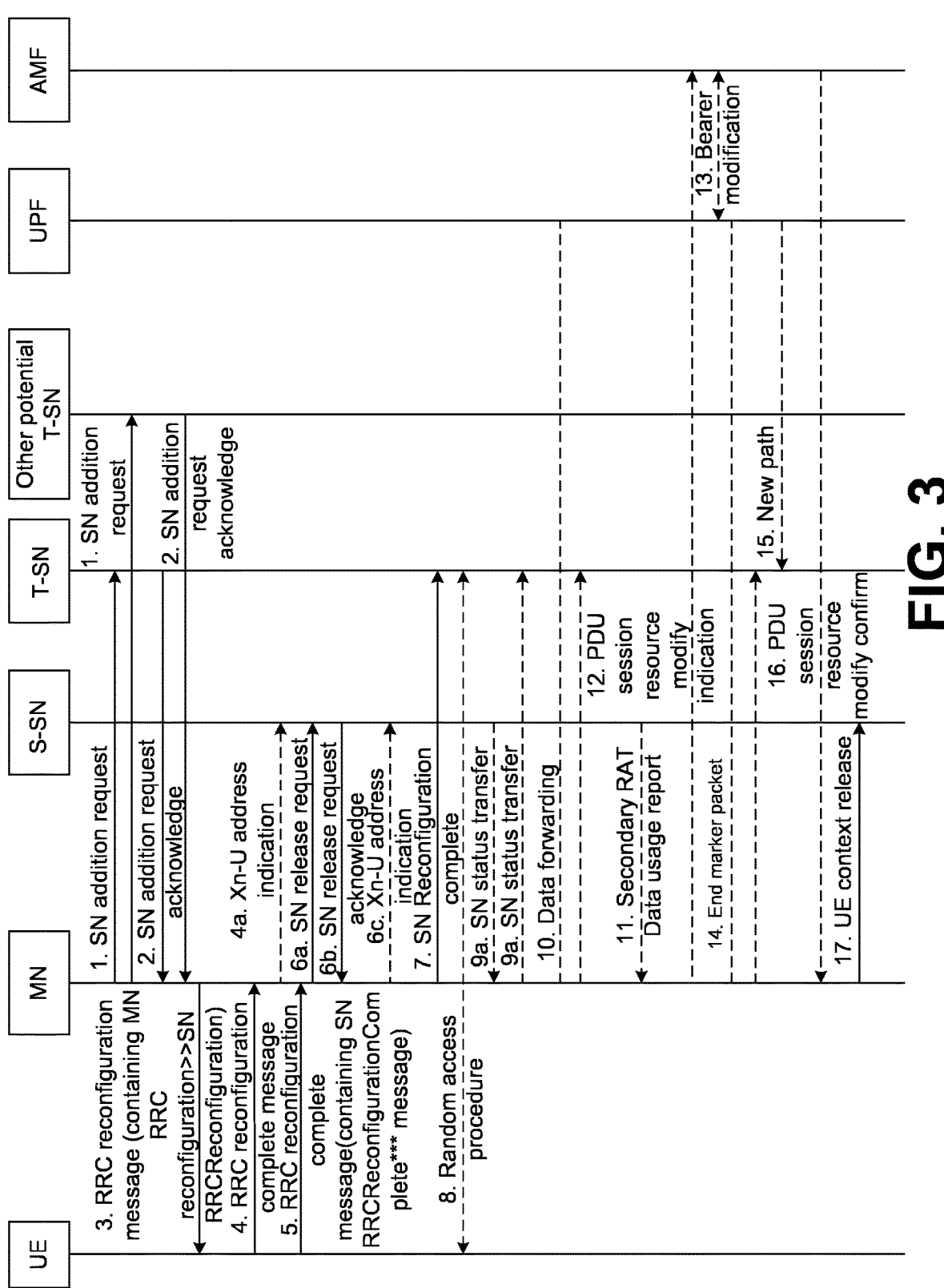
FIG. 3 is a diagram illustrating a conditional PSCell Change (CPC) according to an example embodiment.

FIG. 3 is a diagram illustrating a conditional PSCell Change (CPC) according to an example embodiment. As shown in FIG. 3, a UE may be in communication with a master node (MN), a source-secondary node (S-SN), and/or a target-secondary node (T-SN). A user plane function (UPF) and an access and mobility management function (AMF) are also shown in FIG. 3.

As shown in FIG. 3, in step 1, MN may send a SN addition request message, e.g., including a measurement report from UE, e.g., to suggest a list of PSCell(s) to be prepared by target-SN (T-SN). Thus, at step 1, MN may suggest a list of PSCells to be prepared by forwarding to each T-SN a UE measurement report including the measurement results of the UE for the candidate target PSCells. MN may provide a measurement report including an indication of top target PSCells, reported by UE, e.g., this may provide a suggested list of target PSCells. Also, MN may indicate the maximum number of PSCells that can be prepared by each target SN, e.g., up to 8 PSCells. For example, at step 1, an SN addition request may be sent by MN to T-SN, to prepare one or more target PSCells. T-SN may prepare a target PSCell configuration (target SCG configuration) for one or more target PSCells. A CPC configuration (which may be used for cell change) may include an MCG configuration and a target SCG configuration received from T-SN. Dual connectivity may include MCG configuration and SCG configuration.

In step 2 of FIG. 3, the target SN (T-SN) decides on the one or more candidate target PSCell(s) to be prepared among the cells in the suggested list. For example, the target SN may not be permitted to select a PSCell that is not included in the list. Target SN prepares one or more candidate target PSCells. When T-SN prepares one or more PSCells, T-SN also prepares target SCG configuration (MCG configuration is being provided by MN). As part of T-SN preparing the target SCG configuration for one or more target PSCells, the T-SN may, for example, reserve some resources, such as reserving, e.g., a dedicated user ID (UE ID) for PSCell, a RACH (random access procedure) preamble(s) for random access by UE, and other resources such as radio resources e.g., for guaranteed bit rate, hardware buffers, etc. Also, at step 2, T-SNs may send a SN addition request acknowledge to MN indicating that one or more target PSCells have been prepared.

In step 3 of FIG. 3, MN sends to UE a RRC Reconfiguration message containing the CPC configurations (SCG configuration and MCG configuration) for each of the candidate target PSCells along with the CPC execution conditions for each, e.g., A4 or B1 measurement event. The UE confirms the reception of the reconfiguration in step 4 by sending a RRC reconfiguration complete message to MN.

Upon receiving the MN RRC Reconfiguration complete message from the UE, the MN informs the S-SN that CPC has been configured via Xn-U Address Indication message. The source SN (S-SN), if applicable, starts early data forwarding towards target SN. The forwarding of data, e.g., PDCP PDU and/or PDCP SDU may take place during early data forwarding. The UE may typically select one or more of the prepared PSCells for early data forwarding. However, early data forwarding requires significant resources and signaling overhead for each target PSCell for which early data forwarding is performed.

After step 4 of FIG. 3, the UE evaluates the CPC conditions for the candidate target PSCells. Once the CPC condition is met for a candidate target PSCell, the UE sets this cell as target PSCell and executes CPC configuration (which consists of executing an updated MCG configuration and target SCG configuration) and sends RRC Reconfiguration complete message in step 5 indicating to MN and source SN the execution of the new MCG and SCG configurations, respectively.

In steps 6*a*-6*c* of FIG. 3, the MN triggers the MN-initiated SN release procedure to stop providing user data to the UE and triggers the Xn-U Address Indication procedure to inform the source SN the address of the selected target SN and if applicable to start late data forwarding to the selected target PSCell (in case early data forwarding is not triggered yet).

In step 7 of FIG. 3, the MN forwards to source SN the SN Reconfiguration Complete that is received from the UE in step 5.

In step 8 of FIG. 3, the UE performs the random access procedure to the target SN, if needed (e.g., to establish a connection and/or obtain timing advance information for target SN).

In step 9 of FIG. 3, the source SN sends to target SN the final SN Status Transfer message indicating the count value of the packets that shall be sent to the UE in DL or to UPF in UL.

In step 10 of FIG. 3, the source SN forwards the packets received from UPF to target SN. The remaining steps of FIG. 3 are for switching the UPF path to the new target SN and to release the UE context from the source SN.

In contrast to late data forwarding, early data forwarding has the advantage that the downlink data is available at the target SN at the time of CPC condition. In this case, the user data can be provided to the UE directly without delay. This benefit comes at the cost of increased signaling overhead as the data needs to be forwarded by source SN for multiple candidate target SNs.

According to an example embodiment, in order to reduce overhead, the source-SN may perform early data forwarding only to one or more (or a subset of) target SN(s) controlling one of the prepared candidate target PSCells that the UE will most likely access (to the T-SNs for which the UE will most likely perform handover or cell change). In this way, the source SN may reduce the unnecessary signaling overhead with respect to the target SN that the UE does not access, or is less likely to access or perform cell change towards. In case of an incorrect early data forwarding decision, e.g., the UE performs access (or cell change or handover) to a target SN for which no early data forwarding has been initiated, the source SN can still perform late data forwarding with respect to this target SN.

The issue or potential problem that may arise is that the source SN does not typically have sufficient information to perform selective early data forwarding to only a select subset of T-SNs and/or determine the T-SNs to which the UE will most likely access (the T-SN(s) that control candidate target PSCells to which the UE is most likely to perform cell change or handover). This information is available, for example, at the MN in MN-initiated CPC where MN sets or determines the estimated arrival probability with respect to each target SN that is shared with the target SN. MN can determine the arrival probability for each of the candidate target PSCells (and thus for each candidate T-SN) based on previous statistics and current measurements.

Therefore, according to an example embodiment, the master node (MN) may transmit to a source-secondary node (S-SN) that provides (or assists in providing) dual connectivity to a UE, information indicating or relating to an arrival probability of a cell change for the UE to one or more target-secondary nodes (T-SNs). The information indicating or relating to an arrival probability of a cell change may include, e.g., information indicating or relating to a probability or likelihood the UE may perform handover or cell change to a candidate target PSCell controlled by the T-SN. Based on this received information indicating or relating to an arrival probability (e.g., for the UE to perform cell change) for the UE to one or more target-secondary nodes (T-SNs), the source-secondary node (S-SN) may select a subset of a plurality of target-secondary nodes (T-SNs) to perform early data forwarding from the S-SN. Thus, for example, in this manner, a more intelligent and/or a more efficient approach may be performed by the S-SN, e.g., to only perform early data forwarding to a subset of T-SNs that may have, e.g., a highest or a higher estimated arrival probability (e.g., an estimated probability greater than a threshold of a cell change or handover to a candidate target PSCell controlled by the T-SN, or the top X number (e.g., top 2, 3 or 4) of T-SNs having a highest arrival probability for cell change), and may omit or skip early data forwarding to T-SNs that have a lower estimated arrival probability for cell change. In this manner, the S-SN may allocate resources and perform signaling for early data forwarding only for a subset of one or more T-SNs having a highest estimated arrival probability or highest estimated probability of cell change for the UE, and the S-SN may thereby avoid allocating resources and signaling for early data forwarding to T-SNs having a lower estimated arrival probability or lower probability of cell change for the UE.

FIG. 4 is a flow chart illustrating operation of a master node (MN) according to an example embodiment. Operation 410 includes transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device. Operation 420 includes transmitting, by the master node (MN) to a source-secondary node (S-SN) that provides dual connectivity for a user device, information indicating or relating to an arrival probability of a cell change for the user device to the target-secondary node (T-SN).

For the method of FIG. 4, the conditional PSCell change may include a master node (MN)-initiated conditional PSCell change for the user device.

For the method of FIG. 4, the information indicating or relating to an arrival probability may be transmitted within a Xn-U Address Indication message.

For the method of FIG. 4, the request may be transmitted within a SN-Addition Request message.

For the method of FIG. 4, the method may further include receiving, by the master node (MN) from the source-secondary node (S-SN), a request for assistance information;

wherein the transmitting, by the master node (MN) to a source-secondary node, information indicating or relating to an arrival probability of a cell change for the user device to the target-secondary node (T-SN), is performed based on the request for the assistance information.

For the method of FIG. 4, the information indicating or relating to an arrival probability of a cell change for the user device to the target-secondary node (T-SN), may include, e.g., at least one of the following: an estimated arrival probability for the user device to or towards the target-secondary node (T-SN); information indicating a subset of target-secondary nodes (T-SNs) that the user device may access or connect to; a priority value relating to or associated with the arrival probability of the cell change for the user device to the target-secondary node (T-SN); and/or reference signal measurements performed by the user device of one or more candidate target primary cells of a secondary cell group (candidate target PSCells) of the target-secondary node (T-SN) and location information of the user device to enable the source-secondary node (S-SN) to determine a target PSCell and/or a target secondary node (T-SN) that the user device may likely access or perform cell change to.

For the method of FIG. 4, the transmitting the request may include transmitting, by the master node (MN) to each of a plurality of target-secondary nodes (T-SNs), a request for the target-secondary node (T-SN) to prepare a set of one or more candidate target primary cells of a secondary cell group (candidate target PSCells) for a conditional PSCell change for the user device; and the transmitting the information comprises transmitting, by the master node (MN) to the source-secondary node (S-SN) for each of the plurality of target-secondary nodes (T-SNs), information indicating or relating to an arrival probability of a cell change for the user device to the target-secondary node (T-SN) to allow the source-secondary node (S-SN) to select a subset of the target-secondary nodes (T-SNs) for early data forwarding.

FIG. 5 is a flow chart illustrating operation of a source secondary node (S-SN) according to an example embodiment. Operation 510 includes receiving, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs). Operation 520 includes receiving, by the source-secondary node (S-SN) from a master node (MN), information indicating or relating to an arrival probability of a cell change for the user device to a candidate target PSCell controlled by one or more of the plurality of the target-secondary nodes (T-SNs). And, operation 530 includes selecting, by the source-secondary node (S-SN) based on the received information, a subset of the plurality of target-secondary nodes (T-SNs) to perform early data forwarding from the source-secondary node (S-SN).

For the method of FIG. 5, the method may further include performing, by the source-secondary node (S-SN) before a cell change has been performed, early data forwarding from the source-secondary node (S-SN) to each of the target-secondary nodes (T-SNs) of the selected subset.

For the method of FIG. 5, the conditional PSCell change may include a master node (MN)-initiated conditional PSCell change for the user device.

For the method of FIG. 5, the information indicating or relating to an arrival probability may be transmitted within a Xn-U Address Indication message.

For the method of FIG. 5, the method may further include transmitting, by the source-secondary node (S-SN) to the master node (MN) a request for assistance information; wherein the information indicating or relating to an arrival probability of a cell change is received by the source-secondary node (S-SN) based on the request for the assistance information.

For the method of FIG. 5, the information indicating or relating to an arrival probability of a cell change for the user device to the target-secondary node (T-SN) may include, e.g., at least one of the following: an estimated arrival probability for the user device to or towards the target-secondary node (T-SN); information indicating a subset of target-secondary nodes (T-SNs) that the user device may access or connect to; a priority value relating to or associated with the arrival probability of the cell change for the user device to the target-secondary node (T-SN); and/or reference signal measurements performed by the user device of one or more candidate target primary cells of a secondary cell group (candidate target PSCells) of the target-secondary node (T-SN) and location information of the user device to enable the source-secondary node (S-SN) to determine a target PSCell and/or a target secondary node (T-SN) that the user device may likely access or perform cell change to.

Therefore, according to an example embodiment, the master node (MN) may provide the source (serving) SN with information indicating or relating to an arrival probability of a cell change for the UE to the target-SN (T-SN), e.g., information indicating or relating to a likelihood that the UE executes MN-initiated CPC (conditional PScell change or handover) to a specific target SN controlling at least one prepared PSCell. The MN may provide information, such as one or more of the following, for example: 1) MN may provide the source-SN (S-SN) with the estimated arrival probability of the UE to a specific target SN; 2) MN may indicate to source-SN a subset (e.g., a subset of highest probability T-SNs for cell change for UE) of the target-SNs that the UE may access; 3) MN may indicate to source-SN a priority value, e.g., between 0 and 100, to perform early data forwarding with respect to a particular target-SN, or a priority value may be indicated for each of a plurality of target-SNs. A value of 0 may indicate the least or lowest priority (e.g., associated with a lowest arrival probability or lowest probability of cell change to this T-SN), and a value of 100 may indicate a highest priority (e.g., associated with a highest arrival probability or highest probability of cell change to this T-SN); 4) MN may provide the source-SN with the measurements (e.g., reference signal measurements performed by UE) of the prepared target PSCells and location information of the UE which can allow the source-SN to determine the target PSCell (and in turn target SN) that the UE may likely access. The example information above can be provided by MN to source SN in Xn-U Address Indication message, for example, and can be updated at any time. In one embodiment, source SN can request the MN to provide the aforementioned information indicating or relating to an arrival probability of a cell change for the UE to a target-SN.

Figure 6:
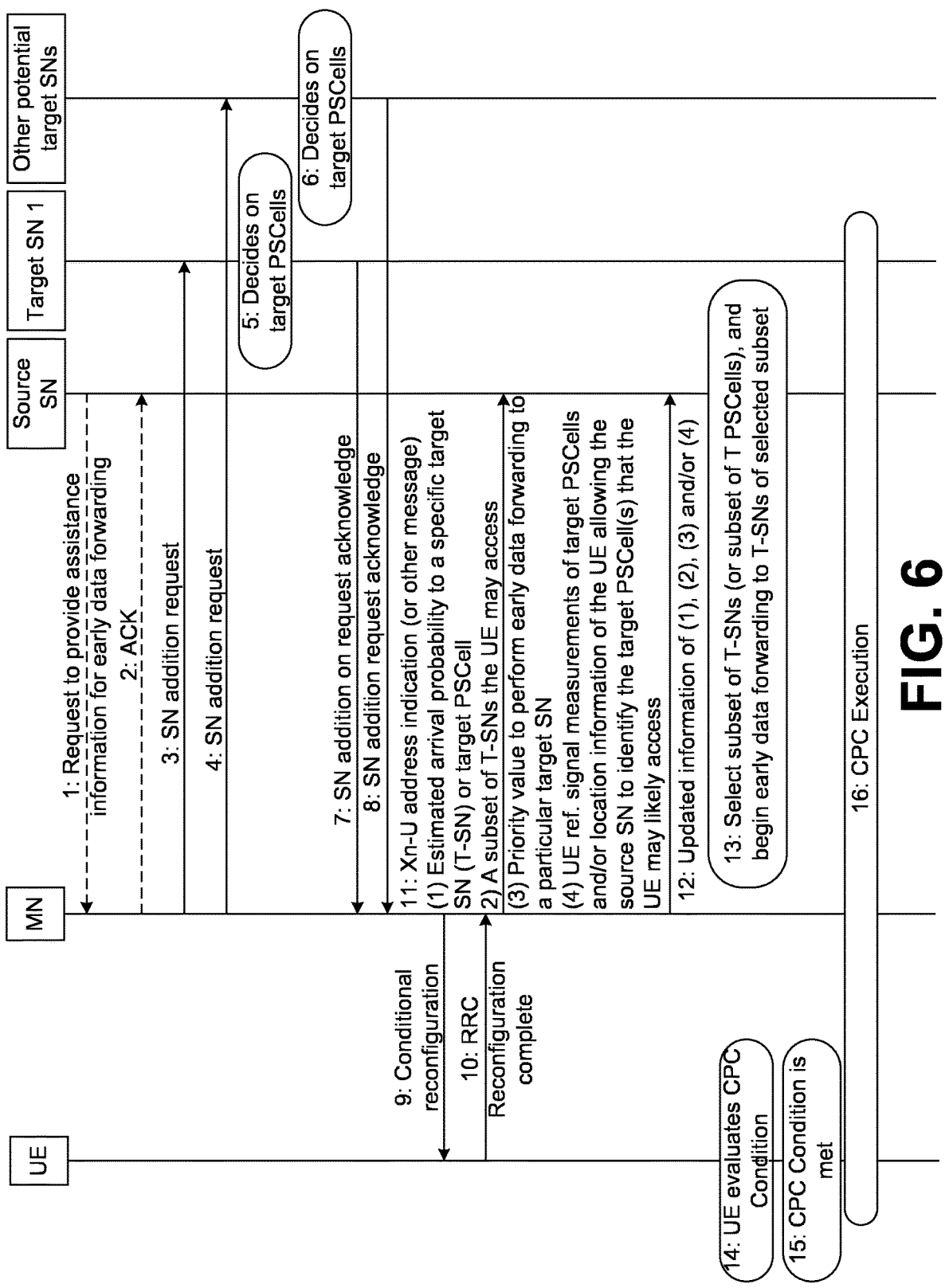
FIG. 6 is a diagram illustrating operation of a network according to an example embodiment.

FIG. 6 is a diagram illustrating a network according to an example embodiment. At step 1, the source-SN may send MN a request to provide assistance information for early data forwarding. At step 2, the MN sends the source-SN an acknowledgement (ACK). At step 3, the MN sends a SN addition request to target SN1 (T-SN1). At step 4, the MN may send a SN addition request to other potential target-SNs. The SN addition request may be or may include a request for the target-secondary node (T-SN) to prepare a set of one or more candidate target primary cells of a secondary cell group (candidate target PSCells) for a conditional PSCell change for the UE. The SN addition request may include UE measurement results, e.g., UE measurements of RSRP (reference signal received power) or RSRQ (reference signal received quality) of reference signals measured by UE from different candidate target PSCells. This may provide a suggested list of target PSCells. Also, MN may indicate the maximum number of PSCells that can be prepared by each target SN, e.g., up to 8 PSCells. For example, at step 3, an SN addition request may be sent by MN to T-SN, to prepare one or more target PSCells. T-SN may prepare a target PSCell configuration (target SCG configuration) for one or more target PSCells. A CPC configuration (which may be used for cell change) may include an MCG configuration and a target SCG configuration received from T-SN. Dual connectivity may include MCG configuration and SCG configuration.

In steps 5 and 6 of FIG. 6, the target SNs (T-SN1 and other T-SN) may select or decide on the one or more candidate target PSCell(s) to be prepared among the cells in the suggested list. For example, with respect to target-SN1 (T-SN1), the T-SN1 may not be permitted to select a PSCell that is not included in the list. T-SN1 prepares one or more candidate target PSCells cells. When T-SN1 prepares one or more PSCells, T-SN1 also prepares target SCG configuration (MCG configuration is being provided by MN). As part of T-SN1 preparing the target SCG configuration for one or more target PSCells, the T-SN1 may, for example, reserve some resources, such as reserving, e.g., a dedicated user ID (UE ID) for PSCell, a RACH (random access procedure) preamble(s) for random access by UE, and other resources such as radio resources e.g., for guaranteed bit rate, hardware buffers, etc. Other T-SNs that receive SN addition request message may similarly prepare one or more PSCells. At steps 7 and 8 of FIG. 6, the target-SNs (e.g., T-SN1 and other T-SNs) may send to MN an SN addition request acknowledge indicating that one or more target PSCells have been prepared.

At step 9 of FIG. 6, MN sends to UE a RRC Reconfiguration message containing the CPC configurations (SCG configuration and MCG configuration) for each of the candidate target PSCells along with the CPC execution conditions for each, e.g., A4 or B1 measurement event. The UE confirms the reception of the reconfiguration at step 10 by sending a RRC reconfiguration complete message to MN.

At step 11 of FIG. 6, upon receiving the MN RRC Reconfiguration complete message from the UE, the MN may send to source-SN (S-SN) (e.g., via a Xn-U Address Indication message, or other message) information indicating or relating to an arrival probability of a cell change for the UE/user device to the target-secondary node (T-SN). Or, for example, MN may indicate to source-SN a subset (e.g., a subset of highest probability T-SNs for cell change for UE) of the target-SNs that the UE may access, and may indicate an arrival probability of a cell change for the UE to each of these indicated T-SNs. This message may inform the S-SN that CPC (conditional PSCell change) has been configured and may provide additional assistance information, e.g., the information indicating or relating to an arrival probability of a cell change for the UE/user device to the target-secondary node (T-SN). Similarly, at step 12, the MN may provide the S-SN with updated information indicating or relating to an arrival probability of a cell change for the UE/user device to the target-secondary node (T-SN).

This information indicating or relating to an arrival probability of a cell change for the UE/user device to the target-secondary node (T-SN) may include one or more of the following, for example: 1) an estimated arrival probability for the user device to or towards the target-secondary node (T-SN); 2) information indicating a subset of target-secondary nodes (T-SNs) that the user device may access or connect to; 3) a priority value relating to or associated with the arrival probability of the cell change for the user device to a target-secondary node (T-SN); or 4) reference signal measurements performed by the user device or UE of one or more candidate target primary cells of a secondary cell group (candidate target PSCells) of the target-secondary node (T-SN) and location information of the user device/UE to enable the source-secondary node (S-SN) to determine a target PSCell and/or a target secondary node (T-SN) that the user device may likely access or perform cell change to.

At step 13 of FIG. 6, the S-SN may select, based on the received information via step 11 and/or step 12, a subset of the plurality of target-secondary nodes (T-SNs) to perform early data forwarding from the source-secondary node (S-SN). The S-SN may then begin or perform early data forwarding of data for the UE to each of the selected T-SNs (of the selected subset of T-SNs).

At step 14, the UE evaluates CPC (e.g., conditional PSCell change) conditions. At step 15, the UE detects that a CPC condition is met for a candidate target PSCell. At step 16 of FIG. 6, once the CPC condition is met for a candidate target PSCell, the UE sets this cell as target PSCell and executes CPC configuration (which consists of executing an updated MCG configuration and target SCG configuration) and sends RRC Reconfiguration complete message indicating to MN and source SN the execution of the new MCG and SCG configurations, respectively. Steps 6a-6c, and steps 7-10 of FIG. 3 may also then be performed.

Example Advantages may include, e.g., one or more of the following:

1) The Source-SN is notified (or made aware) of the likelihood that the UE will perform a random access to (or a cell change or handover to) one or more target-SNs, within a MN-initiated CPC (conditional PSCell change). Thus, the S-SN may receive from MN, information indicating or relating to an arrival probability of a cell change for the UE to a candidate target PSCell controlled by one or more of the plurality of the target-secondary nodes (T-SNs);

2) Based on receiving this information, the source-SN is enabled to select a subset of T-SNs (e.g., those T-SNs having a highest arrival probability or probability of cell change for the UE) of the plurality of target-secondary nodes (T-SNs) to perform early data forwarding from the source-secondary node (S-SN);

3) These techniques may reduce unnecessary signaling overhead caused by performing early data forwarding to T-SNs that the UE is less likely to perform access or random access (e.g., perform cell change) to. Rather, signaling and overhead for early data forwarding may be performed, e.g., only for those T-SNs or target PSCells that have a highest or higher arrival probability of a cell change for the UE. Thus, a more efficient early data forwarding approach may be provided or performed by the UE; and/or 4) One or more techniques, approaches and/or embodiments are described that may allow for an improved (e.g., more informed or more intelligent) selection of the best T-SNs (e.g., higher probability T-SNs for cell change) for early data forwarding, e.g., which may result in or may enable a more efficient early data forwarding from S-SN.

Some further examples will be provided.

Example 1. A method comprising: transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and transmitting, by the master node (MN) to a source-secondary node (S-SN) that provides dual connectivity for a user device, information indicating or relating to an arrival probability of a cell change for the user device to the target-secondary node (T-SN).

Example 2. The method of Example 1, wherein the conditional PSCell change comprises a master node (MN)-initiated conditional PSCell change for the user device.

Example 3. The method of any of Examples 1-3, wherein the information indicating or relating to an arrival probability is transmitted within a Xn-U Address Indication message.

Example 4. The method of any of Examples 1-3, wherein the request is transmitted within a SN-Addition Request message.

Example 5. The method of any of Examples 1-4, further comprising: receiving, by the master node (MN) from the source-secondary node (S-SN), a request for assistance information; wherein the transmitting, by the master node (MN) to a source-secondary node, information indicating or relating to an arrival probability of a cell change for the user device to the target-secondary node (T-SN), is performed based on the request for the assistance information.

Example 6. The method of any of Examples 1-5, wherein the information indicating or relating to an arrival probability of a cell change for the user device to the target-secondary node (T-SN), comprises at least one of the following: an estimated arrival probability for the user device to or towards the target-secondary node (T-SN); information indicating a subset of target-secondary nodes (T-SNs) that the user device may access or connect to; a priority value relating to or associated with the arrival probability of the cell change for the user device to the target-secondary node (T-SN); or reference signal measurements performed by the user device of one or more candidate target primary cells of a secondary cell group (candidate target PSCells) of the target-secondary node (T-SN) and location information of the user device to enable the source-secondary node (S-SN) to determine a target PSCell and/or a target secondary node (T-SN) that the user device may likely access or perform cell change to/towards.

Example 7. The method of Example 1, wherein: the transmitting the request comprises transmitting, by the master node (MN) to each of a plurality of target-secondary nodes (T-SNs), a request for the target-secondary node (T-SN) to prepare a set of one or more candidate target primary cells of a secondary cell group (candidate target PSCells) for a conditional PSCell change for the user device; and the transmitting the information comprises transmitting, by the master node (MN) to the source-secondary node (S-SN) for each of the plurality of target-secondary nodes (T-SNs), information indicating or relating to an arrival probability of a cell change for the user device to the target-secondary node (T-SN) to allow the source-secondary node (S-SN) to select a subset of the target-secondary nodes (T-SNs) for early data forwarding.

Example 8. An apparatus comprising means for performing the method of any of Examples 1-7.

Example 9. A non-transitory computer-readable storage medium comprising instructions stored thereon that, when executed by at least one processor, are configured to cause a computing system to perform the method of any of Examples 1-7.

Example 10. An apparatus comprising: at least one processor; and at least one memory including computer program code; the at least one memory and the computer program code configured to, with the at least one processor, cause the apparatus at least to perform the method of any of Examples 1-7.

Example 11. An apparatus comprising: at least one processor; and at least one memory including computer program code; the at least one memory and the computer program code configured to, with the at least one processor, cause the apparatus at least to: transmit, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and transmit, by the master node (MN) to a source-secondary node (S-SN) that provides dual connectivity for a user device, information indicating or relating to an arrival probability of a cell change for the user device to the target-secondary node (T-SN).

Example 12. A method comprising: receiving, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs); receiving, by the source-secondary node (S-SN) from a master node (MN), information indicating or relating to an arrival probability of a cell change for the user device to a candidate target PSCell controlled by one or more of the plurality of the target-secondary nodes (T-SNs); and selecting, by the source-secondary node (S-SN) based on the received information, a subset of the plurality of target-secondary nodes (T-SNs) to perform early data forwarding from the source-secondary node (S-SN).

Example: 13. The method of Example 12, further comprising: performing, by the source-secondary node (S-SN) before a cell change has been performed, early data forwarding from the source-secondary node (S-SN) to each of the target-secondary nodes (T-SNs) of the selected subset.

Example 14. The method of any of Examples 12-13, wherein the conditional PSCell change comprises a master node (MN)-initiated conditional PSCell change for the user device.

Example 15. The method of any of Examples 12-14, wherein the information indicating or relating to an arrival probability is transmitted within a Xn-U Address Indication message.

Example 16. The method of any of Examples 12-15, further comprising: transmitting, by the source-secondary node (S-SN) to the master node (MN) a request for assistance information; wherein the information indicating or relating to an arrival probability of a cell change is received by the source-secondary node (S-SN) based on the request for the assistance information.

Example 17. The method of any of Examples 12-16, wherein the information indicating or relating to an arrival probability of a cell change for the user device to a candidate target PSCell controlled by one or more of the plurality of the target-secondary nodes (T-SNs); comprises at least one of the following: an estimated arrival probability for the user device for one or more of the plurality of the target-secondary nodes (T-SNs); information indicating a subset of the plurality of target-secondary nodes (T-SNs) that the user device may access or connect to; priority values relating to or associated with the arrival probability of the cell change for the user device to a candidate target PSCell(s) controlled by one or more of the plurality of target-secondary node (T-SNs); or reference signal measurements performed by the user device of one or more PSCells controlled by the plurality the target-secondary node (T-SNs) and location information of the user device to enable the source-secondary node (S-SN) to determine a target PSCell and/or a target secondary node (T-SN) that the user device may likely access or perform cell change to.

Example 18. An apparatus comprising means for performing the method of any of Examples 12-17.

Example 19. A non-transitory computer-readable storage medium comprising instructions stored thereon that, when executed by at least one processor, are configured to cause a computing system to perform the method of any of Examples 12-18.

Example 20. An apparatus comprising: at least one processor; and at least one memory including computer program code; the at least one memory and the computer program code configured to, with the at least one processor, cause the apparatus at least to perform the method of any of Examples 12-17.

Example 21. An apparatus comprising: at least one processor; and at least one memory including computer program code; the at least one memory and the computer program code configured to, with the at least one processor, cause the apparatus at least to: receive, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs); receive, by the source-secondary node (S-SN) from a master node (MN), information indicating or relating to an arrival probability of a cell change for the user device to a candidate target PSCell controlled by one or more of the plurality of the target-secondary nodes (T-SNs); and select, by the source-secondary node (S-SN) based on the received information, a subset of the plurality of target-secondary nodes (T-SNs) to perform early data forwarding from the source-secondary node (S-SN).

Figure 7:
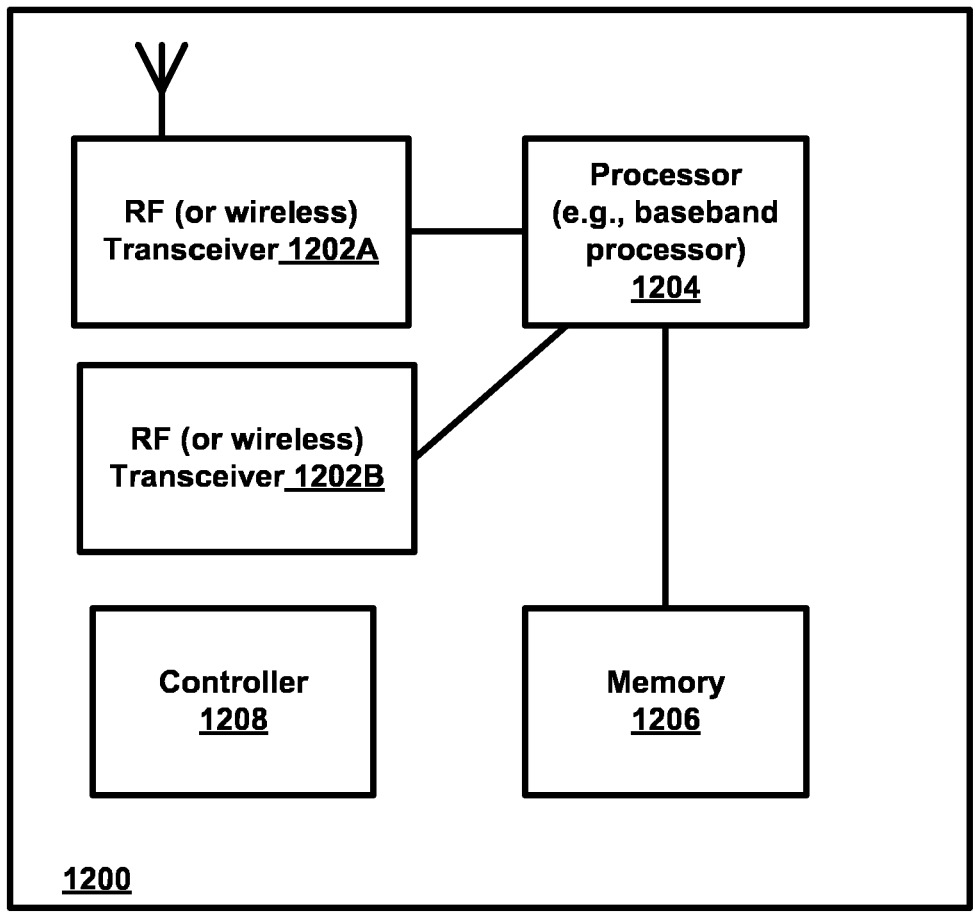
FIG. 7 is a block diagram of a wireless station or node (e.g., network node, gNB, user node or UE, relay node, or other node).

FIG. 7 is a block diagram of a wireless station or node (e.g., UE, user device, AP, BS, eNB, gNB, RAN node, network node, TRP, or other node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and
transmitting, by the master node (MN) to a source-secondary node (S-SN) that provides dual connectivity for a user device, information indicating or relating to an arrival probability of a cell change for the user device to the target-secondary node (T-SN),
wherein the information indicating or relating to an arrival probability is transmitted within a Xn-U Address Indication message.

2. The method of claim 1, further comprising:
receiving, by the master node (MN) from the source-secondary node (S-SN), a request for assistance information;
wherein the transmitting, by the master node (MN) to a source-secondary node, information indicating or relating to an arrival probability of a cell change for the user device to the target-secondary node (T-SN), is performed based on the request for the assistance information.

3. The method of claim 1, wherein the information indicating or relating to an arrival probability of a cell change for the user device to the target-secondary node (T-SN), comprises at least one of the following:
an estimated arrival probability for the user device to or towards the target-secondary node (T-SN);
information indicating a subset of target-secondary nodes (T-SNs) that the user device may access or connect to;
a priority value relating to or associated with the arrival probability of the cell change for the user device to the target-secondary node (T-SN); or
reference signal measurements performed by the user device of one or more candidate target primary cells of a secondary cell group (candidate target PSCells) of the target-secondary node (T-SN) and location information of the user device to enable the source-secondary node (S-SN) to determine a target PSCell and/or a target secondary node (T-SN) that the user device may likely access or perform cell change to.

4. The method of claim 1, wherein:
the transmitting the request comprises transmitting, by the master node (MN) to each of a plurality of target-secondary nodes (T-SNs), a request for the target-secondary node (T-SN) to prepare a set of one or more candidate target primary cells of a secondary cell group (candidate target PSCells) for a conditional PSCell change for the user device; and the transmitting the information comprises transmitting, by the master node (MN) to the source-secondary node (S-SN) for each of the plurality of target-secondary nodes (T-SNs), information indicating or relating to an arrival probability of a cell change for the user device to the target-secondary node (T-SN) to allow the source-secondary node (S-SN) to select a subset of the target-secondary nodes (T-SNs) for early data forwarding.

5. An apparatus comprising:

at least one processor; and at least one memory including computer program code;

the at least one memory and the computer program code configured to, with the at least one processor, cause the apparatus at least to:

transmit, by a master node (MN) to a target-secondary node (T-SN), a request for the target-secondary node (T-SN) to prepare a set of one or more candidate target primary cells of a secondary cell group (candidate target PSCells) for a conditional PSCell change for the user device; and transmit, by the master node (MN) to a source-secondary node (S-SN) that provides dual connectivity for a user device, information indicating or relating to an arrival probability of a cell change for the user device to the target-secondary node (T-SN), wherein the information indicating or relating to an arrival probability is transmitted within a Xn-U Address Indication message.

6. The apparatus of claim 5, further comprising:

receiving, by the master node (MN) from the source-secondary node (S-SN), a request for assistance information;

wherein the transmitting, by the master node (MN) to a source-secondary node, information indicating or relating to an arrival probability of a cell change for the user device to the target-secondary node (T-SN), is performed based on the request for the assistance information.

7. The apparatus of claim 5, wherein the information indicating or relating to an arrival probability of a cell change for the user device to the target-secondary node (T-SN), comprises at least one of the following:

an estimated arrival probability for the user device to or towards the target-secondary node (T-SN);

information indicating a subset of target-secondary nodes (T-SNs) that the user device may access or connect to; a priority value relating to or associated with the arrival probability of the cell change for the user device to the target-secondary node (T-SN); or reference signal measurements performed by the user device of one or more candidate target primary cells of a secondary cell group (candidate target PSCells) of the target-secondary node (T-SN) and location information of the user device to enable the source-secondary node (S-SN) to determine a target PSCell and/or a target secondary node (T-SN) that the user device may likely access or perform cell change to.

8. The apparatus of claim 5, wherein:

the transmitting the request comprises transmitting, by the master node (MN) to each of a plurality of target-secondary nodes (T-SNs), a request for the target-secondary node (T-SN) to prepare a set of one or more candidate target primary cells of a secondary cell group (candidate target PSCells) for a conditional PSCell change for the user device; and the transmitting the information comprises transmitting, by the master node (MN) to the source-secondary node (S-SN) for each of the plurality of target-secondary nodes (T-SNs), information indicating or relating to an arrival probability of a cell change for the user device to the target-secondary node (T-SN) to allow the source-secondary node (S-SN) to select a subset of the target-secondary nodes (T-SNs) for early data forwarding.

9. A method comprising:

receiving, by a source-secondary node (S-SN) within a wireless network that is in communication with a user device as part of dual connectivity, information indicating that a conditional PSCell change has been configured for the user device for one or more candidate target primary cells of a secondary cell group (candidate target PSCells) controlled by each of a plurality of target-secondary nodes (T-SNs);

receiving, by the source-secondary node (S-SN) from a master node (MN), information indicating or relating to an arrival probability of a cell change for the user device to a candidate target PSCell controlled by one or more of the plurality of the target-secondary nodes (T-SNs); and selecting, by the source-secondary node (S-SN) based on the received information, a subset of the plurality of target-secondary nodes (T-SNs) to perform early data forwarding from the source-secondary node (S-SN), wherein the information indicating or relating to an arrival probability is transmitted within a Xn-U Address Indication message.

10. The method of claim 9, further comprising: performing, by the source-secondary node (S-SN) before a cell change has been performed, early data forwarding from the source-secondary node (S-SN) to each of the target-secondary nodes (T-SNs) of the selected subset.

11. The method of claim 9, further comprising: transmitting, by the source-secondary node (S-SN) to the master node (MN) a request for assistance information;

wherein the information indicating or relating to an arrival probability of a cell change is received by the source-secondary node (S-SN) based on the request for the assistance information.

12. The method of claim 9, wherein the information indicating or relating to an arrival probability of a cell change for the user device to a candidate target PSCell controlled by one or more of the plurality of the target-secondary nodes (T-SNs); comprises at least one of the following:

an estimated arrival probability for the user device for one or more of the plurality of the target-secondary nodes (T-SNs);

information indicating a subset of the plurality of target-secondary nodes (T-SNs) that the user device may access or connect to;

priority values relating to or associated with the arrival probability of the cell change for the user device to a candidate target PSCell(s) controlled by one or more of the plurality of target-secondary node (T-SNs); or reference signal measurements performed by the user device of one or more PSCells controlled by the plurality the target-secondary node (T-SNs) and location information of the user device to enable the source-secondary node (S-SN) to determine a target PSCell and/or a target secondary node (T-SN) that the user device may likely access or perform cell change to.

\*   \*   \*   \*   \*